(12) United States Patent (10) Patent No.: US 10,931,614 B2
Kau et al. (45) Date of Patent: Feb. 23, 2021

(54) CONTENT AND MEMBER OPTIMIZATION FOR DOWNSTREAM COLLABORATION

(71) Applicant: INTERNATIONAL BUSINESS MACHINES CORPORATION, Armonk, NY (US)

(72) Inventors: Chris Kau, Mountain View, CA (US); Jeremy R. Fox, Georgetown, TX (US); Liam S. Harpur, Dublin (IE); John Rice, Tramore (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/458,142

(22) Filed: Jun. 30, 2019

(65) Prior Publication Data
US 2020/0412676 A1 Dec. 31, 2020

(51) Int. Cl.
*G06F 15/16* (2006.01)
*H04L 12/58* (2006.01)
*G06N 20/00* (2019.01)

(52) U.S. Cl.
CPC ............. *H04L 51/14* (2013.01); *G06N 20/00* (2019.01)

(58) Field of Classification Search
CPC .............................. H04L 51/14; G06N 20/00
USPC .................. 709/205, 206, 207, 204
See application file for complete search history.

(56) References Cited

U.S. PATENT DOCUMENTS

| 6,192,396 | B1 | 2/2001 | Kohler | |
|---|---|---|---|---|
| 6,643,682 | B1* | 11/2003 | Todd | G06F 16/9535 709/202 |
| 6,681,247 | B1 | 1/2004 | Payton | |
| 6,687,848 | B1* | 2/2004 | Najmi | G06F 9/54 705/28 |
| 7,007,088 | B1* | 2/2006 | Najmi | G06Q 10/00 709/224 |
| 7,305,694 | B2 | 12/2007 | Commons et al. | |
| 7,716,217 | B2 | 5/2010 | Marston et al. | |
| 7,783,711 | B2 | 8/2010 | LeVasseur et al. | |
| 8,990,151 | B2 | 3/2015 | Savage | |
| 9,224,172 | B2 | 12/2015 | Churchill et al. | |
| 9,602,563 | B2 | 3/2017 | Barkai et al. | |
| 9,647,971 | B2 | 5/2017 | Cook et al. | |

(Continued)

OTHER PUBLICATIONS

Ekstrand, M. D. et al., "Collaborative Filtering Recommender Systems", Foundation and Trends in Human-Computer Interaction (2010); vol. 4:2, pp. 81-173.

(Continued)

*Primary Examiner* — Liang Che A Wang
(74) *Attorney, Agent, or Firm* — Intelletek Law Group, PLLC; Gabriel Daniel, Esq.

(57) ABSTRACT

A method and system of adjusting a content of an electronic communication are provided. An electronic communication sent from a first entity to a second entity is received and its content determined. The electronic communication is assigned to a collaboration group based on the determined content. One or more downstream collaboration entities in the collaboration group are identified. For each identified collaboration entity, one or more electronic communication parameters are determined. The electronic communication is adjusted for compliance with the electronic communication parameters of the identified collaboration entities.

19 Claims, 8 Drawing Sheets

(56) References Cited

U.S. PATENT DOCUMENTS

| | | |
|---|---|---|
| 9,679,314 B1 | 6/2017 | Wang |
| 2002/0065884 A1 | 5/2002 | Donoho et al. |
| 2003/0037144 A1 | 2/2003 | Pestoni et al. |
| 2006/0235873 A1* | 10/2006 | Thomas .............. G06F 16/9535 |
| 2008/0294607 A1 | 11/2008 | Partovi et al. |
| 2010/0257457 A1 | 10/2010 | De Goes |
| 2014/0032762 A1 | 1/2014 | Harvey et al. |
| 2017/0083529 A1 | 3/2017 | Grosman et al. |
| 2017/0132495 A1 | 5/2017 | Feris et al. |
| 2017/0163763 A1 | 6/2017 | Krishnamurthy et al. |

OTHER PUBLICATIONS

Jokela, S. et al., "The Role of Structured Content in A Personalized News Service", Proceedings of The 34th Hawaii Inter. Conf. on System Sciences (2001); pp. 1-10.

Kulmukhametov, A. et al., "Content Profiling for Preservation: Improving Scale, Depth and Quality", ICADL (2014); LNCS vol. 8839: 5-7, pp. 1-11.

Mell, P. et al., "Recommendations of the National Institute of Standards and Technology"; NIST Special Publication 800-145 (2011); 7 pgs.

\* cited by examiner

CONTENT AND MEMBER OPTIMIZATION FOR DOWNSTREAM COLLABORATION

BACKGROUND

Technical Field

The present disclosure generally relates to computer systems, and more particularly, to adjustment of content of electronic communication between entities that use computing devices.

Description of the Related Art

Today electronic communication that were originally sent from an author to a recipient can easily be routed to additional recipients as well. Different recipients may have different policies or requirements regarding the content of the messages, including formatting, features to be included, and features to be excluded. For example, an author can generate an electronic message and send it to a user. The user may forward this electronic message to another user, where the content of the message may not be fully compliant with the policies or preferences of the second user. In order to accommodate the second user, messages are typically manually changed before each resend.

SUMMARY

According to various embodiments, a computing device, a non-transitory computer readable storage medium, and a method are provided for adjusting a content of an electronic communication. An electronic communication sent from a first entity to a second entity is received and its content determined. The electronic communication is assigned to a collaboration group based on the determined content. One or more downstream collaboration entities in the collaboration group are identified. For each identified collaboration entity, one or more electronic communication parameters are determined. The electronic communication is adjusted for compliance with the electronic communication parameters of the identified collaboration entities.

In one embodiment, the electronic communication is received by the computing device before the electronic communication reaches the second entity.

In one embodiment, determining a content of the electronic communication includes determining a topic of the electronic communication. The assigning of the electronic communication to a collaboration group based on the determined content may include using the topic and/or an identification of the first entity as an input to a machine learning model to identify the collaboration group.

In one embodiment, collaboration entities that have a probability of receiving the electronic correspondence that is below a predetermined threshold, are removed.

In one embodiment, upon adjusting the electronic communication for compliance, the adjusted electronic communication is automatically sent to all identified downstream collaboration entities of the collaboration group.

In one embodiment, the machine learning model is created during a training phase that includes receiving historical data of electronic communication between entities. For each electronic communication of the historical data, a content of the electronic communication is determined. A collaboration path of the electronic communication is determined. Entities of the collaboration path are identified. A machine learning model is created based on the content, the collaboration path, and the entities of the collaboration path of each electronic communication.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of automatically adjusting the content of an electronic communication based on the expected recipients. Today, electronic communication can come in different form, including, without limitation, common short code (CSC) using a short message service (SMS), multimedia message service (MMS), e-mail, social media, etc. For purposes of discussion, it will be assumed that e-mail communication is used, although it will be understood that other types of electronic communication is supported as well by the present disclosure.

Within organizations, valuable time may be consumed processing daily electronic communications between teams, departments, management, and individuals involved with a project, collectively referred to herein as collaboration entities. Each collaboration entity may have its own protocol or preferences in receiving electronic content, referred to herein as the electronic communication parameters. As an electronic communication is passed along from one collaboration entity to another, the accommodation of the electronic communication parameters of each recipient in the collaboration path, sometimes referred to herein as a communication thread, may be highly time consuming. For example, a user may spend time trying to adjust the electronic communication it received to make it compatible for the new recipient, such that the recipient can effectively collaborate on the project. Often an originator (e.g., author) of an electronic communication may not be aware of the potential downstream collaborators who may ultimately be privy to the content of the electronic communication. Further, an original author may not be aware of the downstream electronic content policies (i.e., electronic communication parameters) that may affect the electronic communication they have generated.

Accordingly, in one embodiment, what is provided herein are methods and systems that use machine learning to identify potential downstream collaborators based on the content of the electronic communication. The content of the electronic communication is adjusted such that it is substantially compatible with the electronic communication parameters of downstream collaboration entities, thereby conserving time and valuable network and computational resources.

Reference now is made in detail to the examples illustrated in the accompanying drawings and discussed below.

Example Architecture

Figure 1:
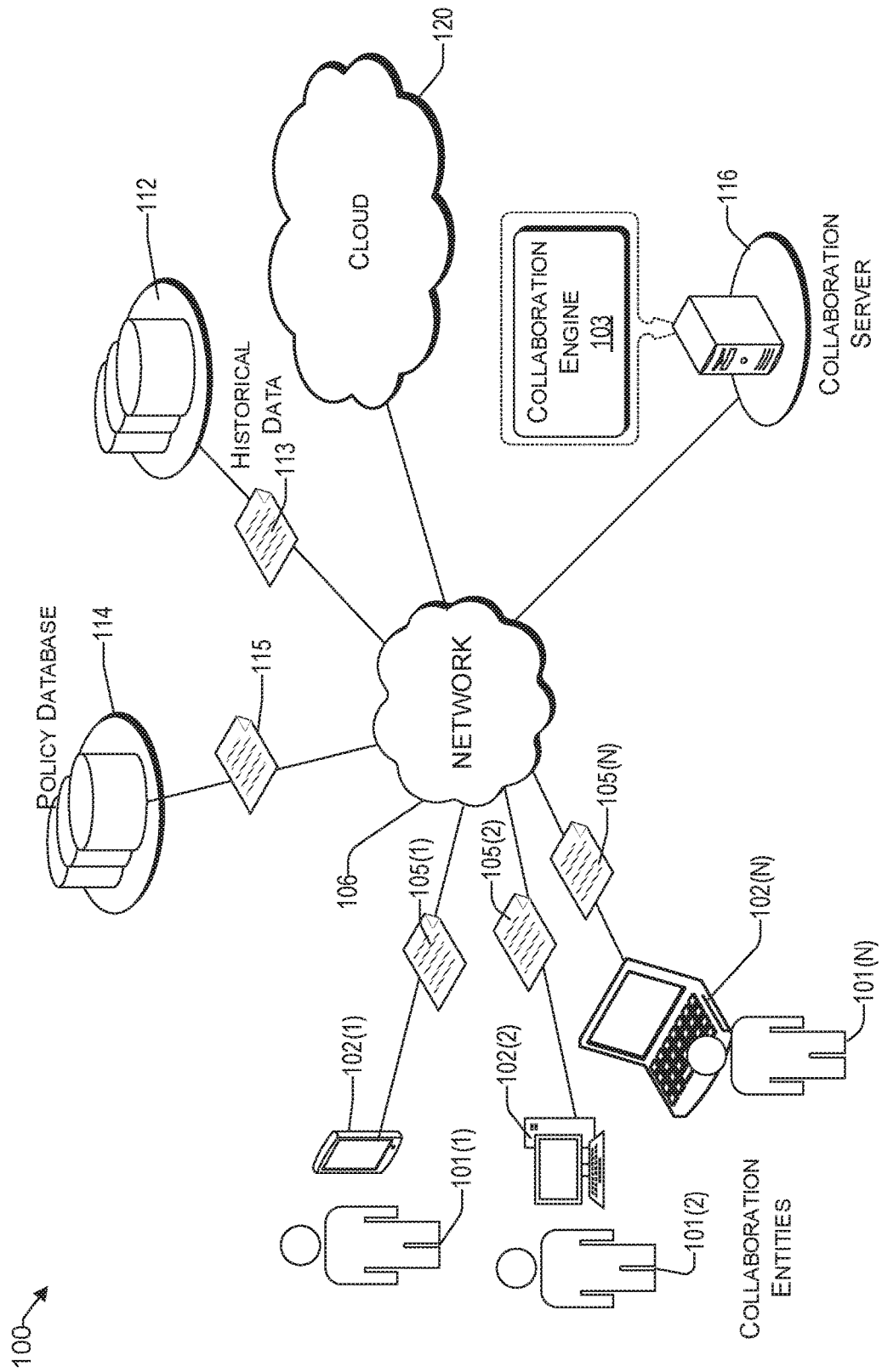
FIG. 1 illustrates an example architecture of a system that automatically adjusts the content of electronic communication to optimize downstream collaboration communication for efficiency.

FIG. 1 illustrates an example architecture 100 of a system that automatically adjusts the content of electronic communication to optimize downstream collaboration communication for efficiency. Architecture 100 may include one or more entities 101(1) to 101(N) who can send and/or receive electronic communication 105(1) to 105(N) to/from other entities who participate in the collaboration system discussed herein. An entity can be an individual, a group, and/or department of an organization that sends electronic communication between the entities to advance a common goal, such as a project. The architecture 100 may include a historical data repository 112, a policy database 114, and a collaboration server 116 that hosts a collaboration engine 103. There is a network that 106 allows the collaboration engine 103 to communicate with various resources connected to the network 106, such as the historical data repository 112, user policy database 114, and entities 101(1) to 101(N). The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with the collaboration engine 103 to adjust the electronic communication between the entities 101(1) to 101(N) to improve efficiency in electronic communication. Such electronic communication may be, without limitation, via e-mail, SMS, text, social media, etc.

For discussion purposes, different user devices 102(1) to 102(N) appear in the drawing, to represent some examples of the client devices that may be used by a collaboration entity to communicate over the network 106. Today, user devices typically take the form of portable handsets, smartphones, tablet computers, personal digital assistants (PDAs), and smart watches, although they may be implemented in other form factors, including consumer, medical, and business electronic devices. Such user devices, as well as others, may be used to send and/or receive electronic communication that has been optimized for collaboration by the collaboration engine 103.

The historical data repository 112 is configured to store and maintain a large set of historical data 113 related to communication between different collaboration groups within which entities typically exchange electronic communication. For example, the historical data 113 may include electronic communication threads between various entities. Each communication thread that includes the original electronic communication can be placed into a corresponding collaboration group. To that end, in one embodiment, machine learning is used to construct algorithms that can learn from and make predictions based on the data that is stored in the historical data repository 112. Such algorithms operate by building a model from stored prior inputs or baselines therefrom in order to make data-driven predictions or decisions (or to provide threshold conditions to indicate whether a communication thread belongs to a predetermined collaboration group), rather than following strictly static criteria. Based on the machine learning, patterns and trends are identified, and any outliers identified as not belonging to the cluster.

In various embodiments, the machine learning discussed herein may be supervised or unsupervised. In supervised learning, during a training phase, the collaboration engine 103 may be presented with historical data 113 from the historical data repository 112 as data that is related to various categories, respectively. Put differently, the historical data repository 112 acts as a teacher for the collaboration engine 103. In unsupervised learning, the historical data repository 112 does not provide any labels as what is acceptable, rather, it simply provides historic data 113 to the collaboration server 116, which can be used to find its own structure among the data to identify the correct collaboration group for a topic associated with a communication thread (e.g., thread).

In various embodiments, the machine learning may make use of techniques such as supervised learning, unsupervised learning, semi-supervised learning, naïve Bayes, Bayesian networks, decision trees, neural networks, fuzzy logic models, and/or probabilistic classification models.

In one embodiment, the collaboration engine 103 uses natural language processing (NLP) to process the raw natural language content of each electronic communication of the historical data 113 to identify the content thereof. This natural language content may be provided as a text (e.g., short message system (SMS), e-mail, etc.,) or via voice. Regarding the latter, the collaboration engine 103 can perform speech recognition to determine the textual representation thereof. In natural speech, there may not be discernable pauses between successive words. To that end, speech segmentation may be performed to separate the words into meaningful sentences.

In one embodiment, concept expansion, such as the IBM Watson® concept expansion, can be used to identify the concept cues in each electronic communication of the historical data 113 to determine the intent thereof. In this regard, the historical data 113 can represent a corpus of unstructured sets of data from which the collaboration engine 103 can learn from. The large sets of unstructured data may relate to electronic communication threads that were successfully clustered into appropriate collaboration groups. As used herein, a collaboration group is a cluster of entities that are associated with a topic, project, etc.

The concept expansion discussed herein enables the creation of a specialized dictionary for the cognitive application of identifying the subject matter and scope of the electronic communication, collectively referred to herein as the indicia of collaboration of the electronic communication thread. Concept expansion enables the collaboration engine 103 to build a specialized dictionary for the cognitive application of identifying the content of an electronic communication, its topic, and ultimately the corresponding collaboration group. Thus, unstructured source text that may not include well-formed language, such as email, text messages, and text that has been extracted via speech recognition. Accordingly, the collaboration engine 103 can correctly understand industry specific terminology, local euphemisms, and colloquial terms that traditional computing devices would be challenged with. For example, the indicia of collaboration may relate to terms that are common to a project, such as a java performance testing project or semiconductor transistor shrinking project.

Thus, during a training phase one or more models are created by machine learning, wherein the models can identify the content as well as the appropriate collaboration group of the electronic communication. In an active phase, these models can be used to determine how to process the electronic communication (e.g., 105(1) to 105(N)) sent out by entities (e.g., 101(1) to 101(N)) participating in the collaboration system of architecture 100. For example, an electronic communication (e.g., 105(1)) is sent by a first entity 101(1) to a second entity 101(2) over the network 106. The collaboration engine 103 of the collaboration server 116 receives the electronic communication 105(1) before it reaches the computing device 102(2) of entity 201(2). Collaboration engine 103 may use NLP and/or concept expansion, as discussed above, to determine the content of the electronic communication 105(1). Based on the machine learning performed during the training phase, the indicia of collaboration are determined from the identified content, which allows the collaboration engine 103 to cluster the electronic communication 105(1) into an appropriate collaboration group. The collaboration group provides the corresponding collaboration entities. For example, the collaboration engine 103 may indicate that entity 101(N) is part of the collaboration group associated with the content of the electronic communication. More specifically, the collaboration engine 103 may indicate that entity 101(2) has a 90% probability of forwarding the electronic communication 105(1) to entity 101(N).

In one embodiment, the clustering of an electronic communication into a group is not deterministic but probabilistic. Stated differently, there may be different probabilities that an electronic communication belongs to different groups. Further, an electronic communication may belong to different collaboration groups. For example, electronic communication 105(1) may have an 80% probability to belong to group A, a 75% probability to belong to group B, a 30% probability to belong to group C, and so on. In one embodiment, if the probability is below a predetermined threshold, then the electronic communication is deemed not belong to the group.

The policy database 114 is operative to store the electronic communication parameters, for entities participating in the collaboration system of architecture 100. The electronic communication parameters 115 may include, without limitation, various conditions, constraints, preferences, etc. For example, electronic communication parameters 115 may relate to requirements, such as the header to include a due date for a response, page numbering to be included, the header to include the name of the topic, no attachments, no commentary about a competing product, etc. In one embodiment, the electronic communication parameters 115 may be provided at different levels of granularity. For example, the parameters may be at an individual level, organizational level (including a group of individuals or a department), or at a social network graph level (e.g., the entire collaboration group).

For each entity deemed to belong to a collaboration group, the collaboration engine 103 is configured to receive the electronic communication parameters 115 from the policy database 114. The electronic communication (e.g., 105(1)) can then be adjusted by the collaboration engine 103 such that the electronic communication parameters 115 for the collaboration entities, sometimes referred to herein as downstream collaboration group, are accommodated. For example, collaboration entity 101(2) may request a due date to be included as a last element in the header, whereas collaboration entity 101(N) may request that a predetermined font and size to be used throughout the electronic communication. Accordingly, in order to accommodate the different collaboration entities that are deemed to be part of the collaboration group, the electronic communication 105(1) is adjusted by the collaboration engine to add the date and remove (e.g., redact) content. In this way, the electronic communication is compatible with not only the electronic communication parameters 115 of entity 101(2), but also possible downstream collaboration entity 101(N). Stated differently, valuable time and computing resources of the computing device 102(2) are conserved by not requiring downstream modification of the electronic communication 105(1) as it is forwarded to collaboration entity 101(N).

In one embodiment, if there is a conflict between the electronic communication parameters of different collaboration entities, then the one identified to have a higher priority (e.g., ranking) wins. To that end, the collaboration engine 103 may receive a corresponding ranking of each entity deemed to be part of the collaboration group.

In one embodiment, the collaboration engine 103, upon determining the downstream collaboration group, automatically sends the electronic communication 105(1) to all downstream entities, even though not all were on the original distribution list. For example, even though entity 101(1) only intends to send the electronic communication 105(1) to entity 101(2), it is automatically adjusted in content and sent to downstream collaboration entity 102(N). That is because the collaboration engine 103 determines that the probability of the electronic communication 105(1) to be forwarded by entity 101(2) to 101(N) is above a predetermined threshold.

By virtue of adjusting the electronic communication before it reaches one or more entities, the efficiency of the collaboration system is improved and the computing resources of the architecture 100 are reduced.

In one embodiment, an entity authoring a new electronic communication (e.g., 105(1)) can specify (i.e., provide authorization), as part of the electronic communication (e.g., 105(1)), as to whether the electronic communication can be adjusted for collaboration purposes. Such authorization may be provided at different levels of granularity (e.g., entirely for the downstream collaboration group, for a sub-group (e.g., a smaller team), or for one or more individuals). In one embodiment, the collaboration engine 103 can solicit approval from and/or report the adjustment of the electronic communication to the original author of the electronic communication.

Figure 2:
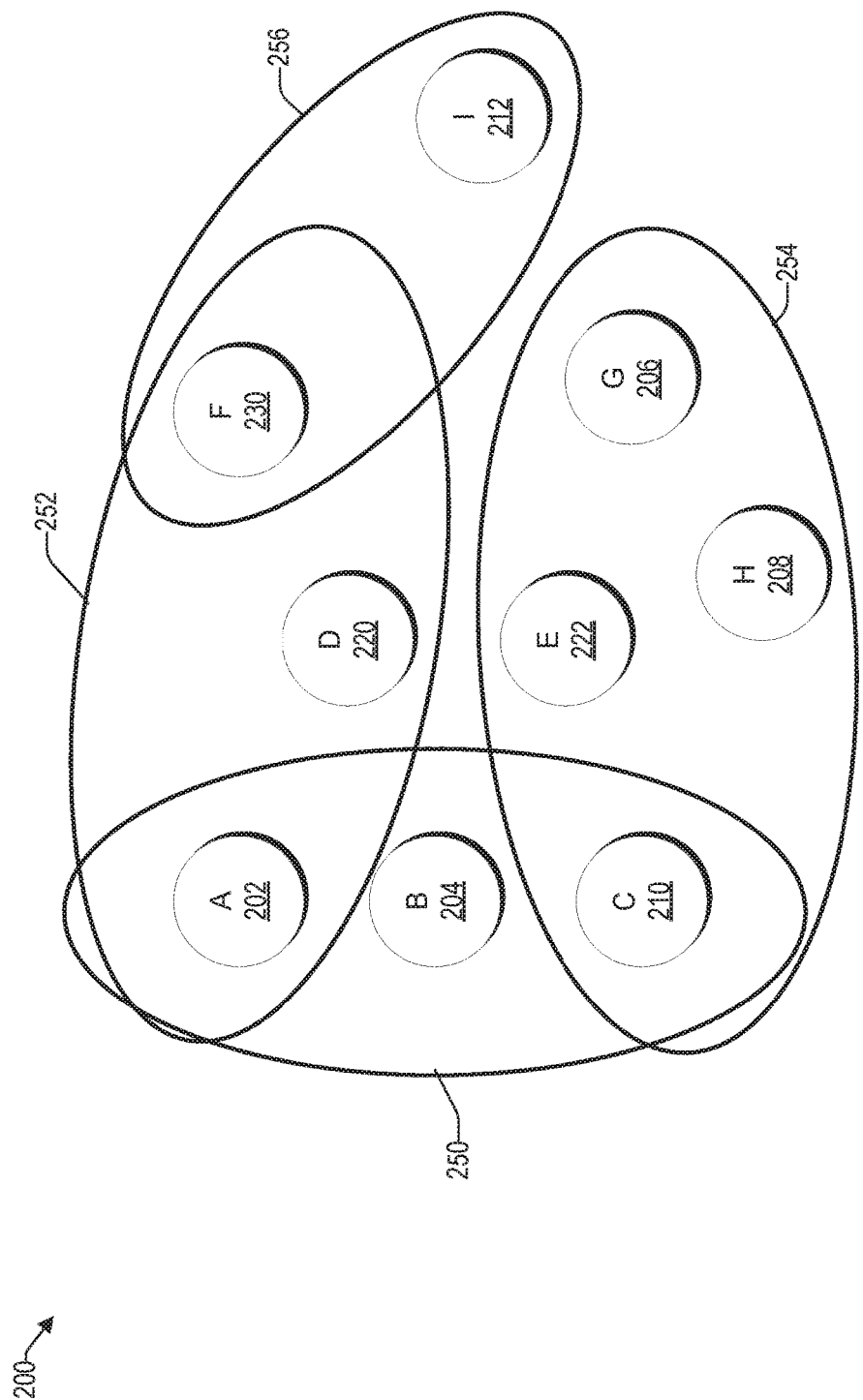
FIG. 2 is a conceptual diagram of the identification of a collaboration group based on a topic, consistent with an illustrative embodiment.

While the historical data repository 112, policy database 114, and the collaboration server 116 are illustrated by way of example to be on different platforms, it will be understood that in different embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage. The cloud is discussed in more detail later.
Example Identification of Collaboration Groups Reference now is made to FIG. 2, which is a conceptual diagram 200 of the identification of a collaboration group based on a topic, consistent with an illustrative embodiment. FIG. 2 includes a plurality of entities of an organization participating in the collaboration system discussed herein, represented by letters A to I. The collaboration engine 103 of FIG. 1 is capable of determining whether an entity belongs to a group and which entity belongs to which group, based on the identified topic of an electronic communication from one entity to another. In the present example of FIG. 2, entities A (202), B (204), and C (210) belong to a first collaboration group 250, which may represent a topic related to human resources of the organization. Entities A (202), D (220), and F (230) are part of a second collaboration group 252, which may represent a topic related to packaging and shipment of a product. Entities C (210) E (222), G (206) and H (208) are part of a third collaboration group 254, which may represent a topic related to java development of a new product. Finally, entities F (230) and I (212) are part of a fourth collaboration group 256, which may represent a topic of power consumption in a semiconductor chip of a product.

Each of the entities may have different electronic communication parameters. For each entity of a collaboration group, the collaboration engine 103 of FIG. 1 is configured to determine the electronic communication parameters of each downstream entity. For example, for the third collaboration group 254, if entity C sends an electronic communication (e.g., email) to E, the electronic communication parameters of E, H and G are determined by the collaboration engine 103 if they are deemed to be part of the same collaboration group 254. The electronic communication is then adjusted such that when the message is forwarded from one entity to another within the collaboration group 254, the electronic communication is compatible with the electronic communication parameters of each entity within the group 254.

Figure 3:
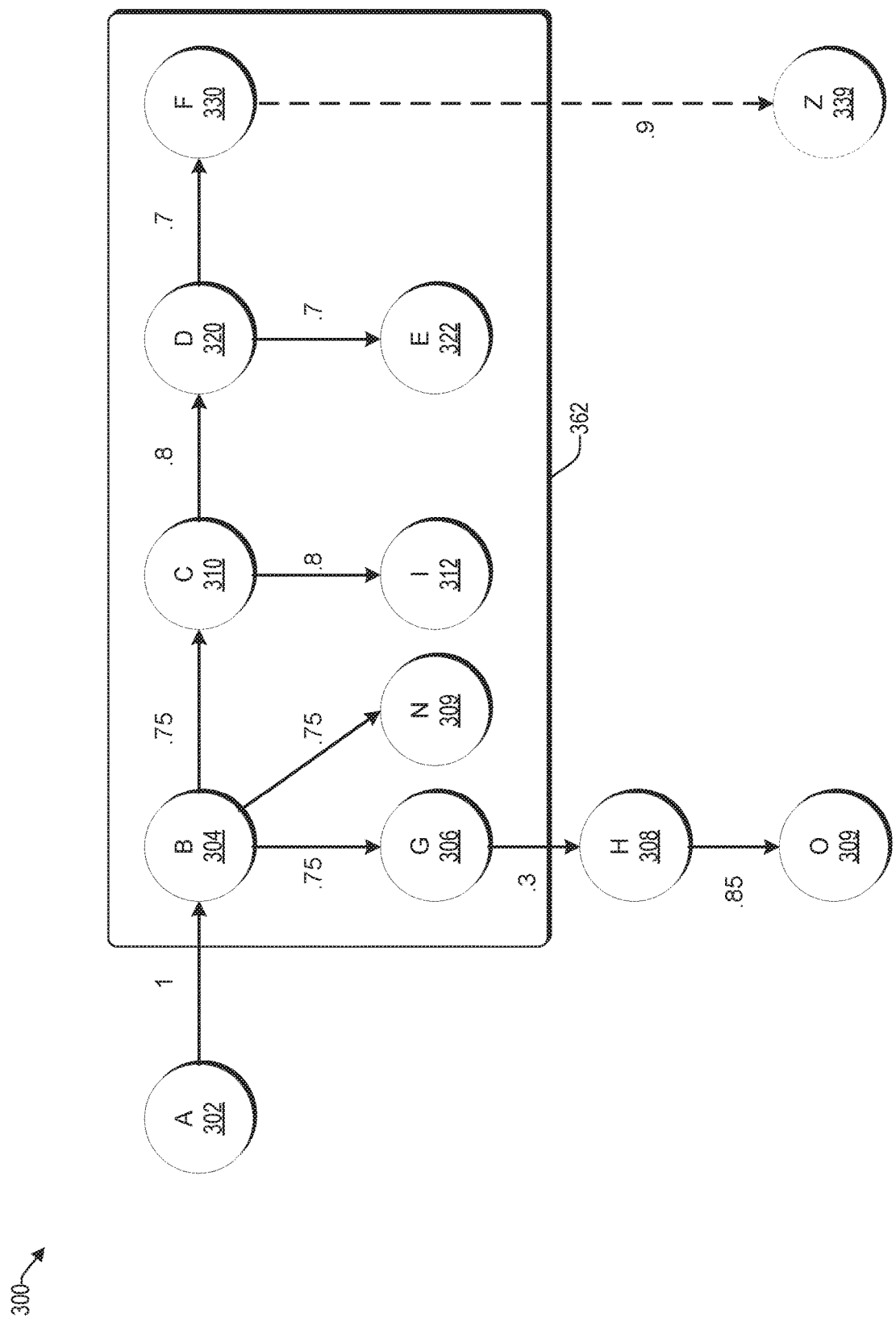
FIG. 3 is a downstream collaboration map based on a topic, consistent with an illustrative embodiment.

Reference now is made to FIG. 3, which is a downstream collaboration map 300, sometimes referred to herein as a social network graph, based on a topic, consistent with an illustrative embodiment. By way of example, consider an organization having many entities. For example, entity A (302) may be a manager of a department who sends an electronic communication (i.e., email in the present example) to the chief technology officer, represented by entity B (304). The manager A may initially not be concerned about the electronic communication parameters of the intended recipient of the email, namely entity B (304). Thus, the electronic communication from entity A to B may not meet all the electronic parameters of recipient B. In this regard, the collaboration engine 103 is operative intercept the electronic communication from entity A (302) before it reaches entity B (304) to determine the content of the communication, based on the techniques discussed previously.

Based on the content, the downstream collaboration entities are identified that are part of the collaboration group related to the identified topic of the content. In the example of FIG. 3, the potential downstream collaborators are entities B, C, D, E, F, G H, I, N, O, and Z. The downstream collaboration map 300 may include a probability that an entity will forward the electronic communication to another entity. For example, since entity A (302), as the originator of the electronic communication, has directed the electronic communication to entity B (304), the probability is 1 on a scale of 0 to 1 (i.e., 100%). The downstream collaboration map 300 generated by the collaboration engine 103 indicates that entity B has a 0.75 probability of forwarding the electronic communication to each of the entities C (310), G (306), and N (309). In turn, upon receipt of the electronic communication, entity C (310) has an 0.8 probability of forwarding the same to each of entities D (320) and I (312). The probability of entity D forwarding the electronic communication to entities F (330) and E (322) is 0.7, each.

In one embodiment, if the probability is below a predetermine threshold, then the entity is not included in the collaboration group. For example, the probability of entity G (306) to forward the electronic communication to entity H (308) is 0.3. If the predetermined threshold is set at 0.6, then the entity H (308) and by extension entity O (309) are not included in the collaboration group. Thus, even though entity H (308) has a probability of 0.85 of forwarding their electronic communication related to the topic to entity O (309), since it is not likely that the electronic communication would reach entity H (308), both entities H (308) and O (309) are not included in the downstream collaboration group 362. Accordingly, in some embodiments, the originator of the electronic communication is a salient factor.

In one embodiment, if the degree of separation between a downstream entity is above a predetermined threshold, then the downstream entity is not included in the collaboration group. As used herein, the degree of separation relates to the number of anticipated transitions of an electronic communication. In the present example of FIG. 3, entity B (304) has a single degree of separation from the originator of the electronic communication A (302). However, Entity F (330) has four degrees of separation from the originator of the electronic communication A (302). If the predetermined threshold for separation is set to four, then any entity that entity F would send the electronic communication to, such as entity Z (339) (that is not already in the collaboration group 362), would not be included in the collaboration group 362, regardless of the probability of entity F forwarding the electronic communication to entity Z (339). Thus, even though the probability that entity F (330) would forward the electronic communication to entity Z (339) is 0.9, entity Z (339) is not included in the collaboration group 362.

By virtue of excluding entities that have a probability of receiving the electronic communication below a first predetermined threshold and/or have a degree of separation that is above a second predetermined threshold, the computational complexity and memory resources of the collaboration server 116 hosting the collaboration engine 103 are reduced.

Upon determining the collaboration group 362, the collaboration engine 103 can then determine the electronic communication parameters for each entity of the collaboration group 362. The original electronic communication from entity A (302) can be adjusted (e.g., by adding or redacting content) such that the electronic communication parameters of each of the entities of the collaboration group 362 are met. If there is a conflict in one or more of the parameters between the entities of the collaboration group 362, deference is given to the entity having a higher-ranking.

In various embodiments, the electronic communication can be routed by the collaboration engine 103 automatically to all entities of the collaboration group 362 or sent only to the originally intended recipient B (304), with the understanding that the electronic communication will likely be routed to the remaining entities of the collaboration group 362 as anticipated by the collaboration map 300, without any additional substantive modifications of the original electronic communication by the downstream collaboration entities.

Example Processes

Figure 4:
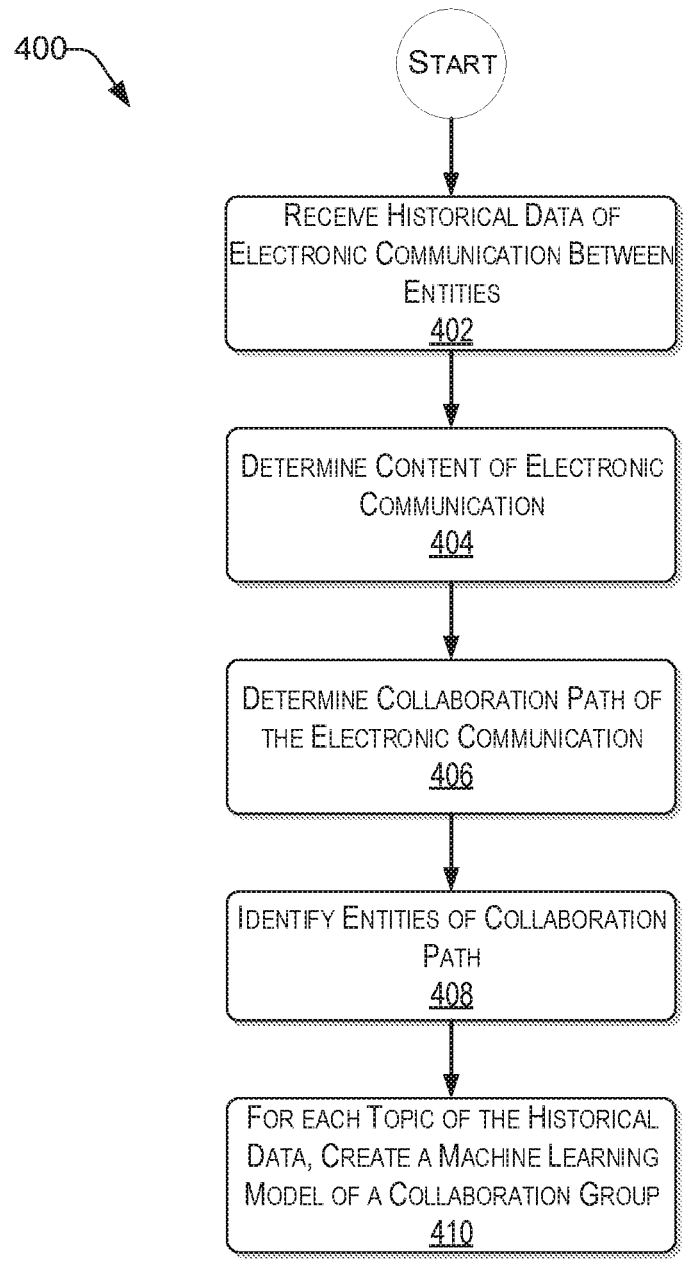
FIG. 4 presents an example process related to adjusting the content of electronic communication during a training phase.
Figure 5:
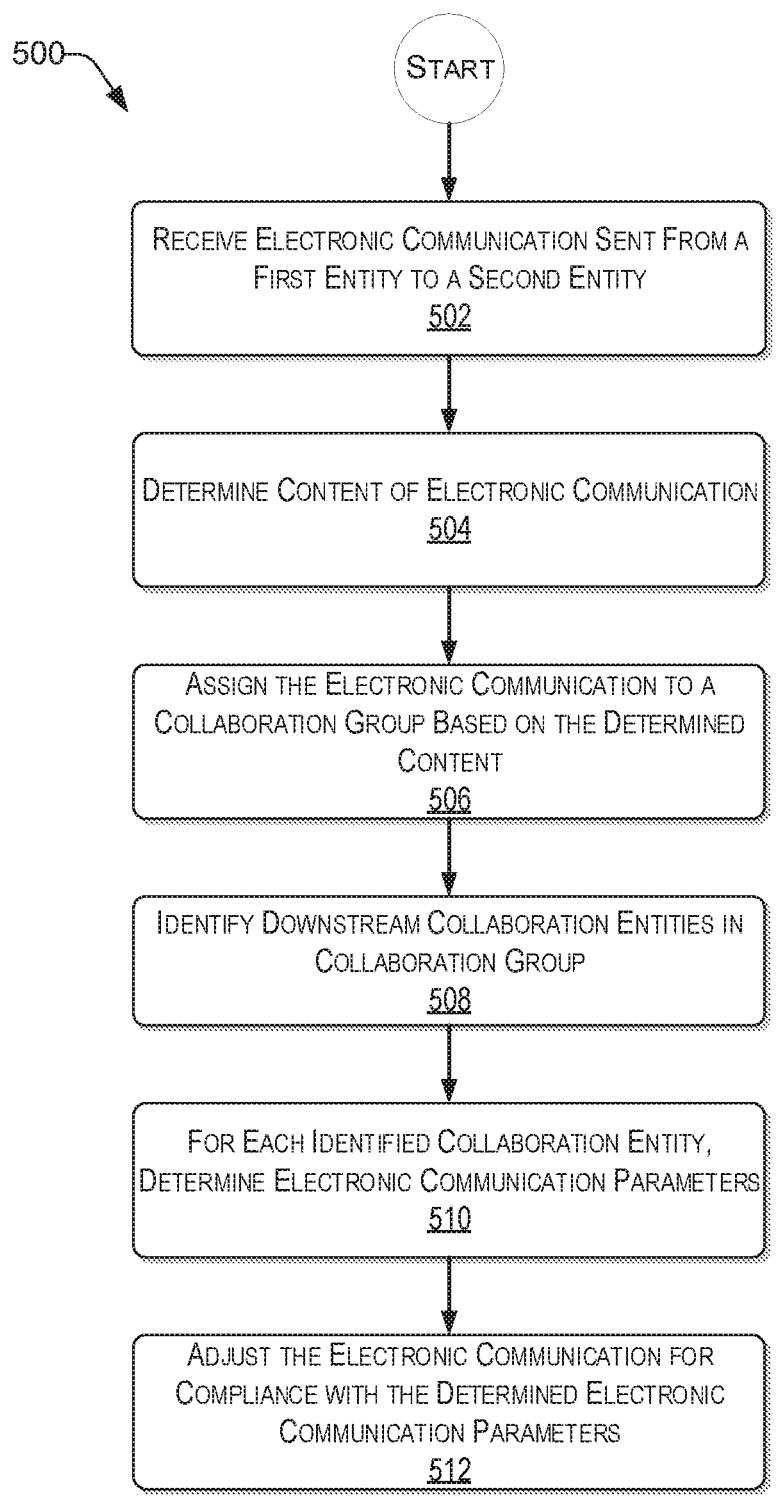
FIG. 5 presents an example process related to adjusting the content of electronic communication during an active phase.

With the foregoing overview of the example architecture 100, conceptual block diagram 200, and collaboration graph 300, it may be helpful now to consider a high-level discussion of example processes. To that end, FIGS. 4 and 5 presents illustrative processes related to adjusting the content of electronic communication based on the content and the expected recipients. More particularly, FIG. 4 relates to a training phase of the machine learning model and FIG. 5 relates to an active phase of using the machine learning model to adjust electronic communication to improve collaboration efficiency. Processes 400 and 500 are each illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 400 and 500 are described with reference to the architecture 100 of FIG. 1.

At block 402 historical data 113 of electronic communication between entities is received by the collaboration engine 103 of the collaboration server 116. This electronic communication may comprise different types of communication, such as text, e-mail, social media, etc.

At block 404, for each electronic communication, a content of the electronic communication is determined. In one embodiment, the determination of the content of the electronic communication includes determining a topic thereof.

At block 406, for each electronic communication, a collaboration path is determined. At block 408, the entities of the collaboration path are identified.

At block 410, for each topic of the historical data, a machine learning model of a collaboration group is created. In one embodiment, the collaboration group comprises a weighted collaboration path based on a probability that the electronic communication will be forwarded to an entity in the chain of the collaboration path. The flow graph is weighted based on a probability of the electronic communication being forwarded to a recipient entity in the chain of the collaboration path. The model(s) generated during the training phase can then be used during the active phase, discussed below in the context of FIG. 5.

FIG. 5 is an example process 500 during an active phase of adjusting a content of an electronic communication based on the expected recipients. At block 502, the collaboration engine 103 of the collaboration server 116 receives an electronic communication sent from a first entity 101(1) to a second entity 101(2) over a network 106. This electronic communication is intercepted by the collaboration engine 103 before it can reach the second entity 101(2).

At block 504, the content of the electronic communication is determined. To that end, various techniques such as NLP and/or concept expansion are used, as discussed herein. Determining the content of the electronic communication includes determining the topic of the electronic communication.

At block 506, the electronic communication is assigned into a collaboration group based on the determined content. For example, the topic of the electronic communication is applied as an input to the machine learning model developed during the training phase to determine the collaboration group. In one embodiment, the source of the electronic communication is used as an additional input to the machine learning model.

At block 508, the downstream collaboration entities are identified from the collaboration group. The downstream collaboration entities are based on, for each collaboration entity, having a probability that the electronic communication will be sent to the collaboration entity being above a predetermined threshold. For example, if the probability that entity 101(2) sends the electronic communication to entity 101(N) is above a predetermined threshold, then, entity 101(N) is included in the downstream collaboration group. In one embodiment, entities that have a probability of receiving the electronic communication that is below the predetermined threshold are removed (i.e., not part of) the downstream collaboration group.

At block 510, for each collaboration entity, one or more electronic communication parameters are determined. To that end, the collaboration engine 103 can receive the electronic communication parameters 115 from the policy database 114.

At block 512, the electronic communication is adjusted for compliance with the electronic communication parameters of the identified collaboration entities. If there is a conflict between the electronic communication parameters of different collaboration entities, then the entity identified to have a higher priority (e.g., ranking) is given deference.

Example Computer Platform

Figure 6:
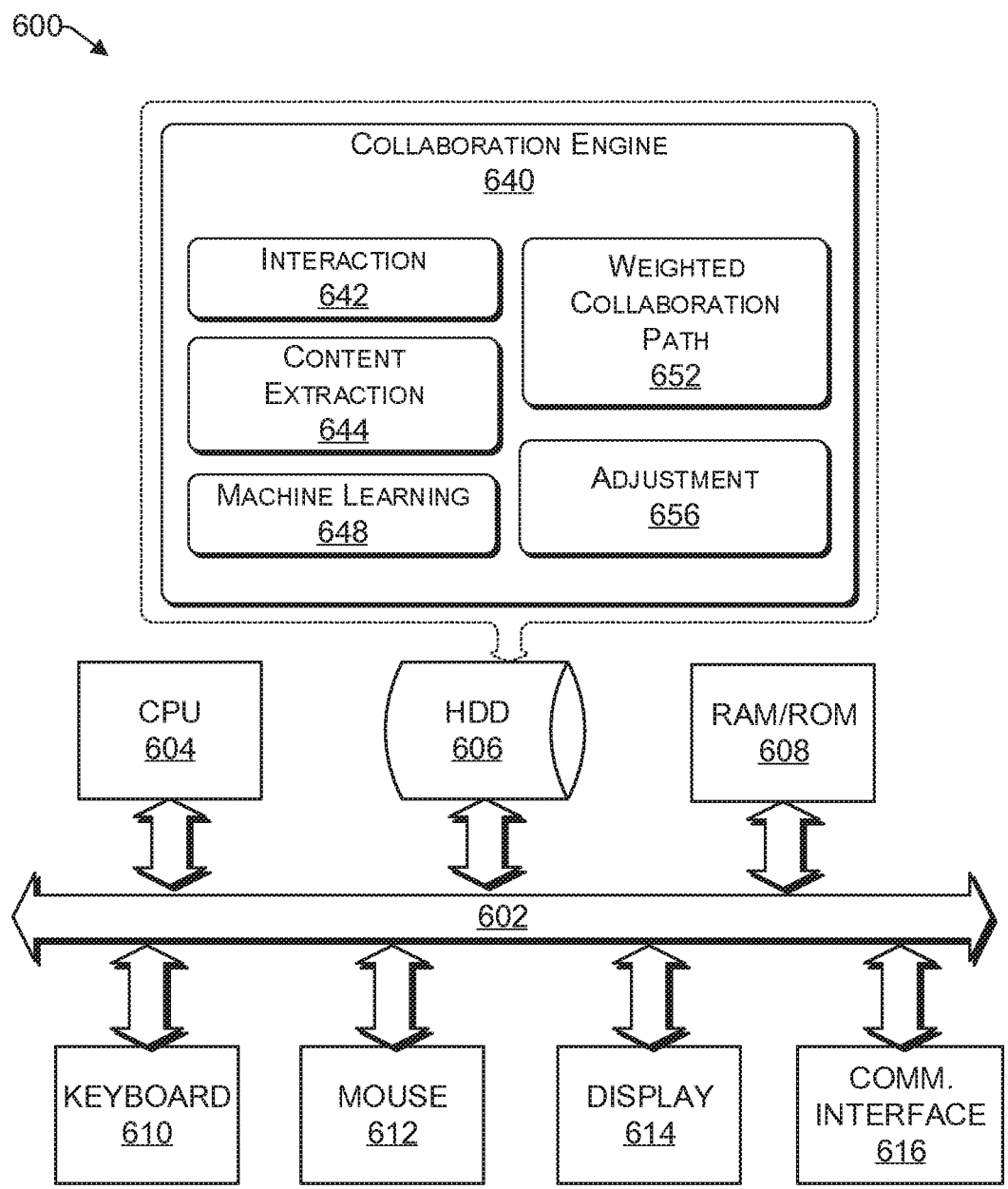
FIG. 6 is a functional block diagram illustration of a computer hardware platform that can be used to implement a particularly configured computing device that can host the collaboration engine of FIG. 1.

As discussed above, functions relating to adjusting the content of electronic communication based on the expected recipients can be performed with the use of one or more computing devices connected for data communication via wireless or wired communication, as shown in FIG. 1 and in accordance with the processes 400 and 500 of FIGS. 4 and 5. FIG. 6 provides a functional block diagram illustration of a computer hardware platform 600 that can be used to implement a particularly configured computing device that can host a collaboration engine 640. In particular, FIG. 6 illustrates a network or host computer platform 600, as may be used to implement an appropriately configured server, such as the collaboration server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the collaboration engine 640, in a manner described herein. The collaboration engine 640 may have various modules configured to perform different functions. For example, there may be an interaction module 642 that is operative to receive electronic data from various sources, the historical database 112, policy database 114, as well as various entities 101(1) to 101(N), as discussed herein.

In one embodiment, there is a content extraction module 644 that is operative to determine the content of each electronic communication. To that end, the content extraction module 644 may use various techniques, such as NLP, concept expansion, etc., as discussed herein. Based on the extracted content, the topic of the electronic communication can be determined.

There may be a machine learning module 648 operative to, during a training phase, learn from historical data to build one or more machine learning models that can be used to determine an appropriate downstream collaboration group associated therewith. There may be a weighted collaboration path module 652 operative to generate a weighted collaboration path based on historical data. There may be an adjustment module 656 operative to adjust a received electronic communication such that it is compatible with the electronic communication parameters of the downstream entities of a collaboration group associated with the electronic communication.

In one embodiment, a program, such as Apache™, can be stored for operating the system as a Web server. In one embodiment, the HDD 606 can store an executing application that includes one or more library software modules, such as those for the Java™ Runtime Environment program for realizing a JVM (Java™ virtual machine).

Example Cloud Platform

As discussed above, functions relating to managing the compliance of one or more client domains, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
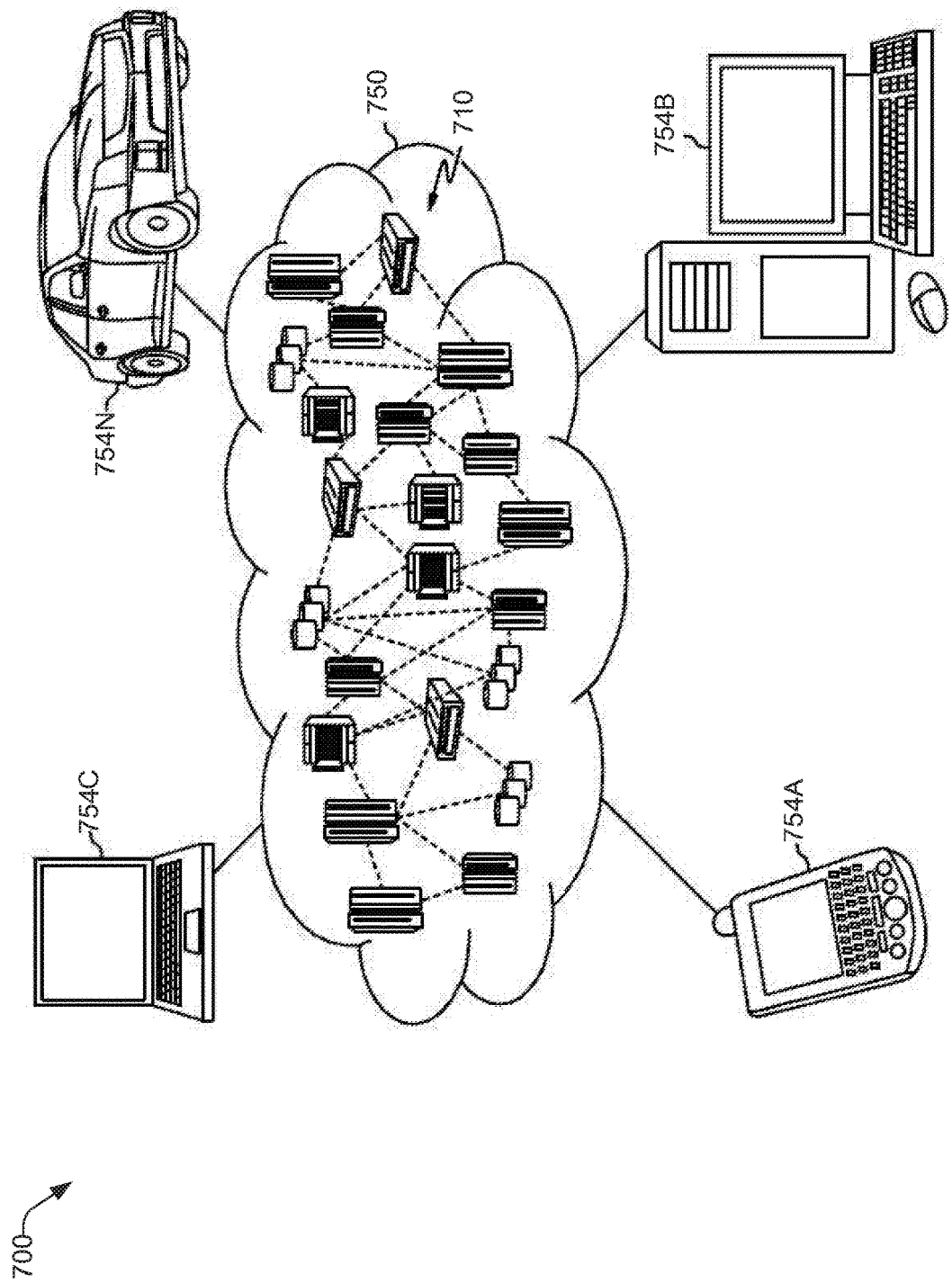
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
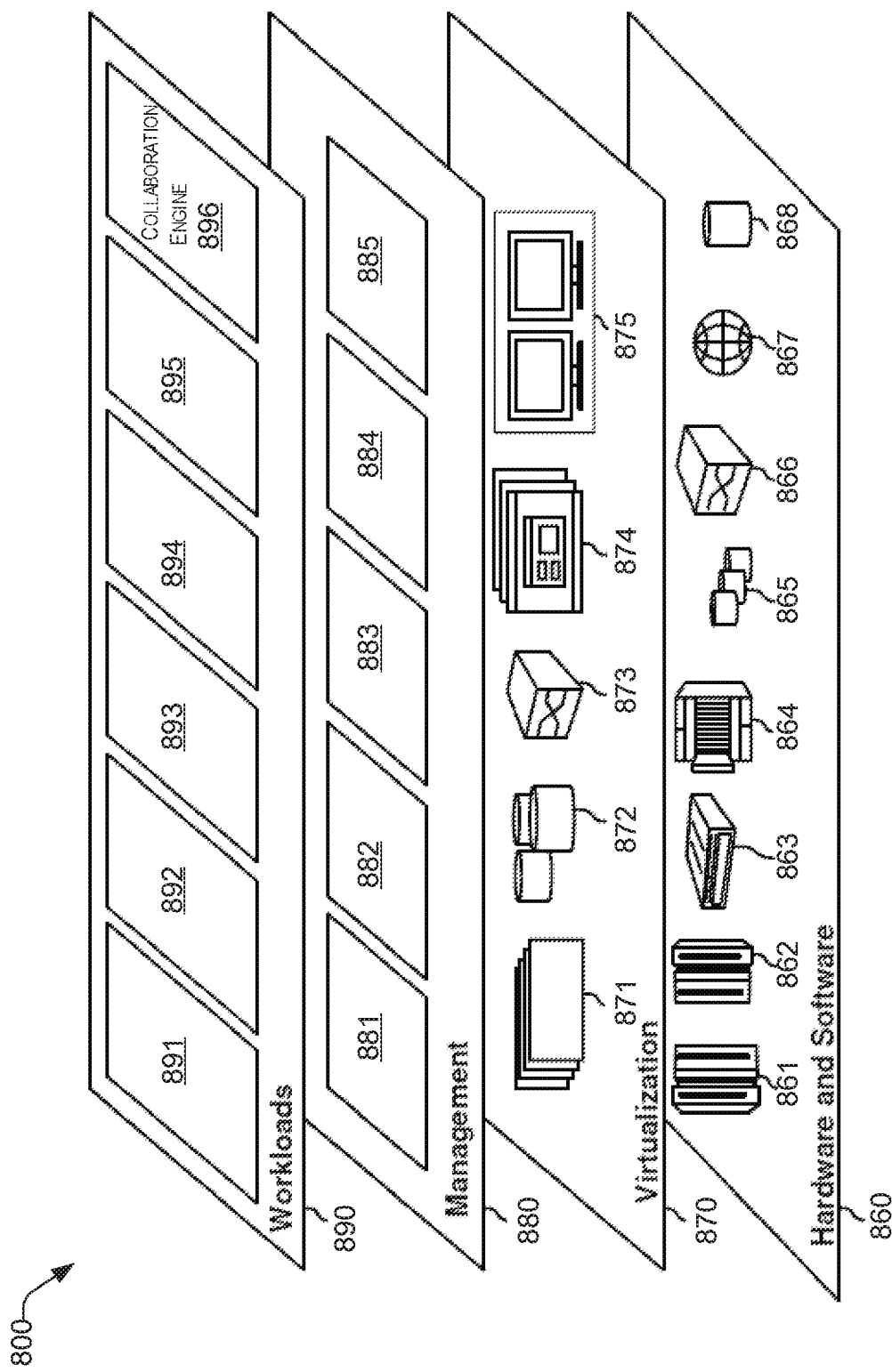
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and collaboration engine 896, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device coupled to the processor;
   an engine stored in the storage device, wherein an execution of the engine by the processor configures the computing device to perform acts comprising:
   receiving an electronic communication sent from a first entity to a second entity;
   determining a content of the electronic communication;
   assigning the electronic communication to a collaboration group based on the determined content;
   identifying one or more downstream collaboration entities in the collaboration group;
   for each identified collaboration entity, determining one or more electronic communication parameters; and
   adjusting the electronic communication for compliance with the electronic communication parameters of the identified collaboration entities, comprising:
   determining whether there is a conflict between the electronic communication parameters between the identified collaboration entities; and
   upon determining that there is a conflict:
   determining a ranking of each of the identified collaboration entities having the conflict; and
   allowing the electronic communication parameters of the collaboration entity having a higher ranking supersede the electronic communication parameters of the collaboration entity having a lower ranking.

2. The computing device of claim 1, wherein the electronic communication is received by the computing device before the electronic communication reaches the second entity.

3. The computing device of claim 1, wherein determining a content of the electronic communication comprises determining a topic of the electronic communication.

4. The computing device of claim 3, wherein assigning the electronic communication to a collaboration group based on the determined content comprises using the topic as an input to a machine learning model to identify the collaboration group.

5. The computing device of claim 4, wherein an identification of the first entity is used as an additional input to the machine learning model to identify the collaboration group.

6. The computing device of claim 1, wherein for each downstream collaboration entity, removing the corresponding collaboration entity that has a probability of receiving the electronic communication that is below a predetermined threshold.

7. The computing device of claim 1, wherein the execution of the code by the processor further configures the computing device to perform acts comprising removing collaboration entities that have a probability of receiving the electronic correspondence that is below a predetermined threshold.

8. The computing device of claim 1, wherein the execution of the code by the processor further configures the computing device to perform acts comprising, upon adjusting the electronic communication for compliance, automatically sending the adjusted electronic communication to all identified downstream collaboration entities of the collaboration group.

9. The computing device of claim 1, wherein if a degree of separation between the first entity and another entity is above a predetermined threshold, then the another entity is not included in the collaboration group.

10. The computing device of claim 3, wherein the machine learning model is created by the computing device during a training phase, comprising:
   receiving historical data of electronic communication between entities;
   for each electronic communication of the historical data:
      determining a content of the electronic communication;
      determining a collaboration path of the electronic communication; and
      identifying entities of the collaboration path; and
   creating the machine learning model based on the content, the collaboration path, and the entities of the collaboration path of each electronic communication.

11. The computing device of claim 10, wherein the electronic communication of the historical data comprises at least one of e-mail, text messages, or social media.

12. The computing device of claim 10, wherein determining a content of the electronic communication of the historical data comprises determining a topic.

13. A non-transitory computer readable storage medium tangibly embodying a computer readable program code having computer readable instructions that, when executed, causes a computer device to carry out a method of adjusting a content of an electronic communication, the method comprising:
   receiving an electronic communication sent from a first entity to a second entity;
   determining a content of the electronic communication;
   assigning the electronic communication to a collaboration group based on the determined content;
   identifying one or more downstream collaboration entities in the collaboration group;
   for each identified collaboration entity, determining one or more electronic communication parameters; and
   adjusting the electronic communication for compliance with the electronic communication parameters of the identified collaboration entities, comprising:
      determining whether there is a conflict between the electronic communication parameters between the identified collaboration entities; and
      upon determining that there is a conflict:
         determining a ranking of each of the identified collaboration entities having the conflict; and
         allowing the electronic communication parameters of the collaboration entity having a higher ranking supersede the electronic communication parameters of the collaboration entity having a lower ranking.

14. The non-transitory computer readable storage medium of claim 13, wherein the electronic communication is received by the computing device before the electronic communication reaches the second entity.

15. The non-transitory computer readable storage medium of claim 13, wherein determining a content of the electronic communication comprises determining a topic of the electronic communication.

16. The non-transitory computer readable storage medium of claim 15, wherein assigning the electronic communication to a collaboration group based on the determined content comprises using the topic and an identification of the first entity as an input to a machine learning model to identify the collaboration group.

17. The non-transitory computer readable storage medium of claim 13, further comprising, removing collaboration entities that have a probability of receiving the electronic correspondence that is below a predetermined threshold.

18. The non-transitory computer readable storage medium of claim 13, further comprising, upon adjusting the electronic communication for compliance, automatically sending the adjusted electronic communication to all identified downstream collaboration entities of the collaboration group.

19. The non-transitory computer readable storage medium of claim 16, wherein the machine learning model is created during a training phase, comprising:
   receiving historical data of electronic communication between entities;
   for each electronic communication of the historical data:
      determining a content of the electronic communication;
      determining a collaboration path of the electronic communication; and
      identifying entities of the collaboration path; and
   creating machine learning model based on the content, the collaboration path, and the entities of the collaboration path of each electronic communication.

* * * * *